Figure 2:
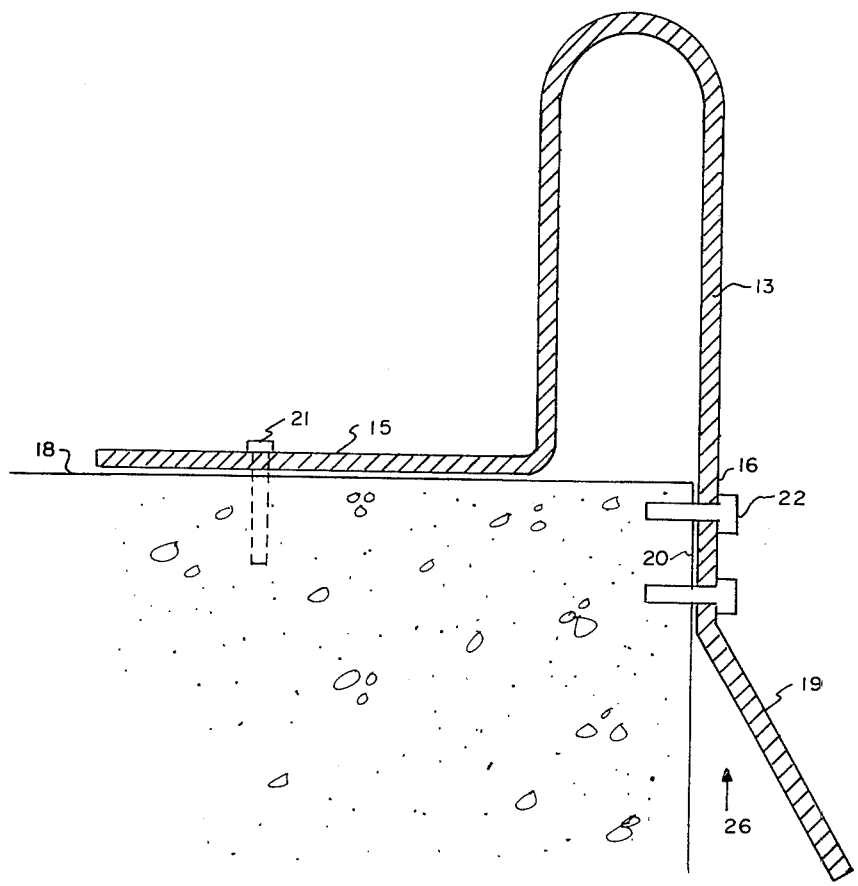

United States Patent [19]
Veldman

[11] 3,933,125
[45] Jan. 20, 1976

[54] BEDDING RETAINER

[75] Inventor: Adrian Veldman, St. Pauls, Canada

[73] Assignee: Wildwood Farm Services International Inc., St. Pauls, Canada

[22] Filed: Feb. 14, 1974

[21] Appl. No.: 442,423

[30] Foreign Application Priority Data
Apr. 27, 1973 Canada .................................. 169764

[52] U.S. Cl. .................................................. 119/28
[51] Int. Cl.² ............................................ A01J 1/00
[58] Field of Search ........................... 119/28, 15, 27

[56] References Cited
FOREIGN PATENTS OR APPLICATIONS
787,677   6/1968   Canada .................................. 119/28
559,579   9/1932   Germany ............................... 119/28

Primary Examiner—Louis G. Mancene
Assistant Examiner—Peter K. Skiff
Attorney, Agent, or Firm—Finnegan, Henderson, Farabow & Garrett

[57] ABSTRACT

A bedding retainer which provides a more rigid construction by providing means which engage the surfaces of the walls of the gutter to the stall and which provides a means of protecting cables or the like that are required or exist in most modern barns by having a plenum between the skirt of the retainer and the surfaces of the walls of the gutter to the stall.

3 Claims, 2 Drawing Figures

BEDDING RETAINER

The present invention relates to an improved bedding retainer for use in an animal stall to retain bedding within the confines of the stall.

In the usual layout of modern barns there are rows of stalls on concrete floors with a gutter separating adjacent rows. Material such as straw is spread over the floor of each stall for bedding. However, the constant movement of the animal in the stall tends to shift the bedding backward into the gutter where it is spoiled for future use. Bedding material falling into the gutter also interferes with the cleaning of the gutter, especially where such cleaning is mechanised.

A retainer is often placed across the back of the floor of the stall to prevent the backward shift of the bedding into the gutter. Such retainer consists of boards, usually 2 × 4's, laid one on top of the other and nailed to the upright end posts of the stall. A structure of substantial strength is necessary to withstand the stress imposed upon it by the animal in the stall but it is cumbersome in construction and time comsuming to install when 2 × 4's are used. Recently my neighbour, William Langdom, obtained Canadian Pat. No. 787,677 for a "Bedding Keeper" which avoided some of these problems. That retainer however fails to provide sufficient support for the upstanding or upright portion of the retainer. This is primarily due to the fact that over the years, as a result of improved animal husbandry, the animals have tended to become physically larger with greater propensity that the animals are larger for the animal stall than for which that stall was originally designed or created.

It is a primary object of the present invention, therefore, to provide a new and improved bedding retainer for the same general type as that of Langdon, but which further provides enhanced rigidity and a means of protecting cables, such as electrical wiring and the like, which are additionally required and exist in most modern barns.

It is an ancillary object to provide a bedding retainer which expands the area of the stall.

It is a further object of the invention to provide a bedding keeper which permits conventional gutter cleaners to operate to clean the walkways and gutters of stalls and not to foul mechanical linkages of conventional gutter cleaners.

The invention therefore contemplates a bedding retainer for use in retaining bedding in an animal stall having a floor bounded by a gutter wall and gutter comprising a horizontally elongated upright portion, a flange integral with the upright portion extending laterally therefrom, improvement comprising a skirt depending from the upright portion below the plane of said defining between the skirt and gutter wall a plenum, said skirt flange with means disposed along the skirt below the plane for securing the depending skirt to the gutter whereby additional structural support is given to the upright portion.

Preferably the bedding retainer is formed of a single sheet of rigid material with upstanding portion having an inverted U shape in transverse cross section, the flange extending from one upright arm to form an extending surface by which the stall area is expanded, and the skirt portion expanding from the other upright arm appropriately bent or disposed so as to come in close proximity with the wall of the gutter whereby it may be secured thereto.

Figure 1:
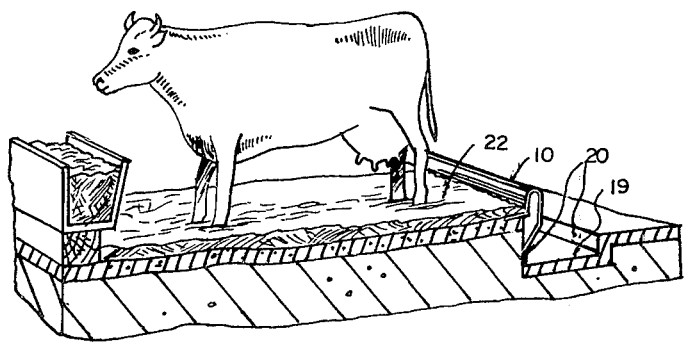
Figure 3:
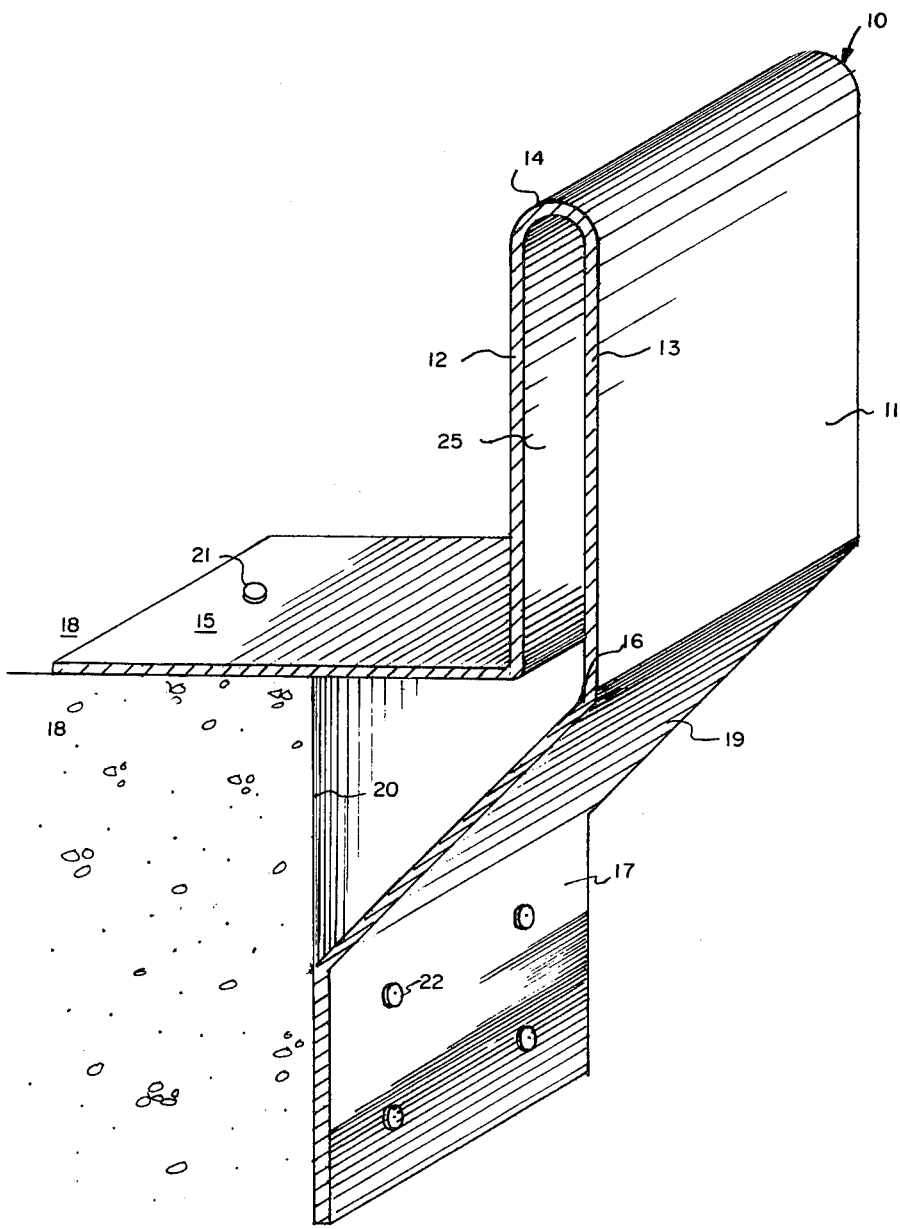

The embodiments of the invention will now be described by way of example with reference to the accompanying drawings in which:

FIG. 1 is a perspective view of a bedding retainer according to the invention, being affixed to the flooring of a barn; and, FIG. 2 is a side elevation of one embodiment of the bedding retainer in place in an occupied stall; and, FIG. 3 is a perspective view showing an alternative embodiment of the bedding retainer in place in an occupied stall.

Referring to FIG. 1 a bedding retainer 10 is constructed of a rigid sheet material such as galvanized steel and consists of an upright portion 11 formed by bending the sheet into an inverted U-shape with two downward depending arms 12 and 13 and an arc crown 14. The free end portion of arm 12 is bent laterally at right angles to form an outwardly extending flange 15 perpendicular to the upright portion 11. Preferably the outward extending flange 15 is of great expanse so that it will act in part as an extending floor for the stall (FIG. 3). The other arm 13 extends downwardly below the plane of the flange 15 in close proximity to the gutter to form a depending skirt therefor.

Preferably, in one embodiment, referring to FIG. 3, the depending skirt 16 depends into an angular or obtuse section 19, thence into a lower section 17 non-co-linear with the upper section 16 but parallel thereto interconnected by the obtuse section 19. Through the lower non-co-linear parallel section 17 apertures are provided through which a bolt or bolts 22 is provided for securing the skirt portion to the side wall 20 of the gutter 19. The flange 15 has holes punched 7/16 inch × ¾ inch every two feet for easy installation of the bedding retainer with lags or bolts.

As shown in the drawing the bedding retainer 10 is located on the flooring 18 of a stall adjacent the gutter 19 having the vertical wall 20. The flange 15 is fixed to the floor 18 in a position whereby the depending skirt 16 bears for a portion of its length against the wall 20 of the gutter 19. Usually the flooring 18 and the gutter 19 are of concrete and the flange 15 may be secured to the flooring by suitable rivets 21 as provided by a rivet gun or alternatively may be bolts or lags.

Satisfactory rigidity and strength of the bedding retainer 10 of FIG. 3 may be obtained by fabricating the bedding retainer from galvanized sheet metal of at least one-eighth inch thickness. The dimensions of the bedding retainer 10 are suitable as follows:

Heighth of upright portion 11 - 3 inches (7.6 cm)
Radius of crown 14 - one-half inch (1.7 cm)
Width between arms 12 and 13 - one inch (2.5 cm)
Width of extended flange 15 - 7 inches (17.8 cm)
Width of lower portion of skirt 18 one and one-half inches (4.5 cm) disposed 3 inches (7.6 cm) below the plane of the flange 15.

In this embodiment the plenum 25 defined by the crown 14, the arms 11, 13, and the depending skirt portion 16 as well as a portion of the gutter wall 20 can be used to house cables for cleaners such as electrical wiring.

Referring to FIG. 2 an alternative bedding retainer 10 may be provided wherein an open region 26 is disposed beneath an extending obtuse skirt portion 16. In such embodiment cables can be relocated through the region 26 at will without the removal of the retainer 10.

In this embodiment the extent of the flange 15 is not as large as that of FIG. 3 as the retainer does not extend the width of the stall as the embodiment of FIG. 3.

The embodiments of the invention in which an exclusive property or privilege is claimed are defined as follows:

1. A bedding retainer for use in retaining bedding in an animal stall having a floor bounded by a gutter wall and a gutter, said retainer comprising a horizontally elongated, upright portion formed of a single sheet of rigid material with the upstanding portion having an inverted U shape in transverse cross section; a flange integral with and extending laterally from one upright arm of the upright portion to form an extending surface by which the stall area is expanded, a skirt depending from the other upright arm of the upright portion to a point below the level of said flange and defining between the skirt and the gutter wall a plenum, said skirt portion being appropriately bent or disposed so as to come into close proximity with the wall of the gutter and having means disposed along the skirt below the level of the flange for securing the depending skirt to the gutter wall whereby additional structural support is given to the upright portion.

2. The bedding retainer of claim 1 wherein the skirt portion obtusely bends towards the flange and then extends into a depending portion parallel to the upright portion, the depending portion adapted to engage the surface of the gutter wall.

3. A bedding retainer for use in retaining bedding in an animal stall having a floor bounded by a gutter wall and a gutter, said retainer comprising a horizontally elongated, upright portion; a flange integral with the upright portion extending laterally therefrom, a skirt depending from the upright portion to a point below the level of said flange, said skirt extending colinearly to the upright portion to permit a portion thereof to engage the surface of the gutter wall, but then into a depending portion angulated obtusely, to define a plenum between the gutter wall and the depending portion; and means disposed along the skirt for securing the skirt to the gutter wall whereby additional structural support is given to the upright portion.

* * * * *